(12) United States Patent
Shimada (10) Patent No.: US 7,840,775 B2
(45) Date of Patent: Nov. 23, 2010

(54) STORAGE SYSTEM IN WHICH RESOURCES ARE DYNAMICALLY ALLOCATED TO LOGICAL PARTITION, AND LOGICAL DIVISION METHOD FOR STORAGE SYSTEM

(75) Inventor: Kentaro Shimada, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 423 days.

(21) Appl. No.: 12/015,573

(22) Filed: Jan. 17, 2008

(65) Prior Publication Data

US 2008/0250219 A1 Oct. 9, 2008

(30) Foreign Application Priority Data

Apr. 6, 2007 (JP) .............................. 2007-100563

(51) Int. Cl.
*G06F 12/00* (2006.01)

(52) U.S. Cl. .......................... 711/173; 711/6; 711/114; 711/118; 711/E12.001

(58) Field of Classification Search .................... None
See application file for complete search history.

(56) References Cited

U.S. PATENT DOCUMENTS

2006/0200643 A1    9/2006 Tomita et al.
2008/0141264 A1*   6/2008 Johnson ........................ 718/105

FOREIGN PATENT DOCUMENTS

JP    2006-244098    9/2006

* cited by examiner

*Primary Examiner*—Shawn X Gu
(74) *Attorney, Agent, or Firm*—Brundidge & Stanger, P.C.

(57) ABSTRACT

The resources in a storage system including host IF units 101, drive IF units 102, disk drives 103, data transfer engines 105, cache memories 107, and control processors 109 are partitioning targets. A processor 301 in each control processor 109 creates plural logical units by logically partitioning the partitioning target resources, and changes, according to the amount of access from the host computer, the proportion allocated to each logical partition.

7 Claims, 7 Drawing Sheets

| LOGICAL PARTITION 1 | LOGICAL PARTITION 2 | LOGICAL PARTITION 3 | ... | LOGICAL PARTITION x |
|---|---|---|---|---|
| EMBEDDED-TYPE STORAGE CONTROL PROGRAM | EMBEDDED-TYPE STORAGE CONTROL PROGRAM | EMBEDDED-TYPE STORAGE CONTROL PROGRAM | | EMBEDDED-TYPE STORAGE CONTROL PROGRAM |
| RESOURCE ALLOCATION CONTROL (HYPERVISER) ||||||
| PROCESSOR a | PROCESSOR b | PROCESSOR c | | PROCESSOR x |

FIG.4B

| LOGICAL PARTITION 1 | LOGICAL PARTITION 2 | LOGICAL PARTITION 3 | ... | LOGICAL PARTITION x |
|---|---|---|---|---|
| STORAGE CONTROL PROGRAM | STORAGE CONTROL PROGRAM | STORAGE CONTROL PROGRAM | | STORAGE CONTROL PROGRAM |
| OS | OS | OS | | OS |
| RESOURCE ALLOCATION CONTROL (HYPERVISER) |||||
| PROCESSOR a | PROCESSOR b | PROCESSOR c | | PROCESSOR x |

FIG.6

STORAGE SYSTEM IN WHICH RESOURCES ARE DYNAMICALLY ALLOCATED TO LOGICAL PARTITION, AND LOGICAL DIVISION METHOD FOR STORAGE SYSTEM

CROSS-REFERENCES TO RELATED APPLICATIONS

This application relates to and claims priority from Japanese Patent Application No. 2007-100563, filed on Apr. 6, 2007, the entire disclosure of which is incorporated herein by reference.

BACKGROUND

1. Field of the Invention

The invention relates to a storage system, and more particularly to a technique for partitioning resources in a storage system into logical partitions.

2. Description of Related Art

Recently, the need for storage consolidation aimed at reducing the cost of installation or management of storage systems has been increasing more and more. It is expected that from now on, data owned by several separate departments or companies will be stored in a single storage system by utilizing storage consolidation technology. In that case, a technique for enabling provision of a single storage system as plural virtual storage systems, and more particularly a logical partition technique for storage systems, is necessary for preventing management or performance interference in a single storage system. A method for statically allocating IO (Input/Output) performance (data transfer performance or transaction processing performance) or cache capacity when setting logical partitions in a storage system has been proposed (JP-A-2006-244098).

In the above mentioned technique, the allocation amount is changed when setting logical partitions in a storage system. However, when doing so, it is necessary to determine a schedule in advance, or input a special command from a host computer, and therefore it is difficult to change the amount of allocated resources dynamically when the storage system is online. Therefore, the maximum amount of resources which can be used, such as IO performance and cache capacity, that would be required has to be allocated from the beginning. In other words, the maximum amount of resources required has to be allocated to each logical partition even if there is a possibility that the system will be modified from its initial state or that the load from the host computer will change. As a whole, resources allocated, but not in use, may not be able to be used effectively.

An object of the invention is to dynamically change the amount of allocated resources in a storage system.

SUMMARY

To achieve the above stated object, the invention provides a storage system in which the proportion of resources in the storage system targeted by access from a host computer is dynamically changed according to the amount of access from the host computer.

In other words, the invention provides a storage system including: a storage unit having plural storage devices; plural processors for inputting/outputting data to/from the storage unit in response to a data IO request from a host computer; and a transfer controller for connecting each processor to the storage unit and controlling data IO. In the storage system, each processor creates plural logical partitions by logically partitioning resources targeted by access from the host computer, and changes, according to the amount of access, the proportion of resources allocated to each logical partition.

The storage system according to a preferred embodiment of the invention also includes the following features. Each processor changes, according to the proportion of resources being used by each logical partition, the proportion allocated to the logical partition. The processor observes the proportion of resources being used by each logical partition, and increases, by a predetermined fixed percentage, the proportion of resources allocated to a logical partition if, according to the observed proportion, the proportion of resources being used by the logical partition exceeds a preset range. Meanwhile, if, according to the observed proportion, the proportion of resources being used by a logical partition is below the preset range, the processor reduces, by a predetermined fixed percentage, the proportion of resources allocated to the logical partition. The resources include the storage unit, the processors, and the transfer controller.

The storage system according to another aspect of the invention includes: two or more host IF units connected to a host computer; two or more disk drives; two or more drive IF units connected to the disk drives for controlling the disk drives; cache memory for temporarily storing data to be read/written from/to the disk drives; two or more data transfer engines for transferring data between the host IF units and the cache memory or between the drive IF units and the cache memory; a transfer switch for connecting the host IF units, the disk IF units, and the data transfer engines; a cache switch for connecting the data transfer engines and the cache memory; two or more control processors; and a control signal switch for switching control signal lines between the data transfer engines and the control processors. Each control processor creates plural logical partitions by logically partitioning resources targeted by access from the host computer, makes each logical partition operate independently, and changes, according to the amount of access from the host computer, the proportion of resources allocated to each logical partition.

In a preferred embodiment, the control processor changes, according to the proportion of resources being used by each logical partition, the proportion of resources allocated to each logical partition. The processor observes the proportion of resources being used by each logical partition, and increases, by a predetermined fixed percentage, the proportion allocated to the relevant logical partition if, according to the observed proportion, the proportion of resources being used by a logical partition exceeds a preset range. Meanwhile, if, according to the observed proportion, the proportion of resources being used by a logical partition is below the preset range, the processor reduces, by a predetermined fixed percentage, the proportion allocated to the logical partition. The resources include the host IF units, the disk drives, the cache memory, the data transfer engines, and the control processors.

With the invention, the amount of allocation, indicating the proportion of resources in the storage system, can be dynamically changed.

BRIEF DESCRIPTION OF THE DRAWINGS

FIGS. 4(a) and 4(B) are diagrams illustrating the logical concept of a hypervisor and an operating system.

DETAILED DESCRIPTION OF PREFERRED EMBODIMENTS

Figure 1:
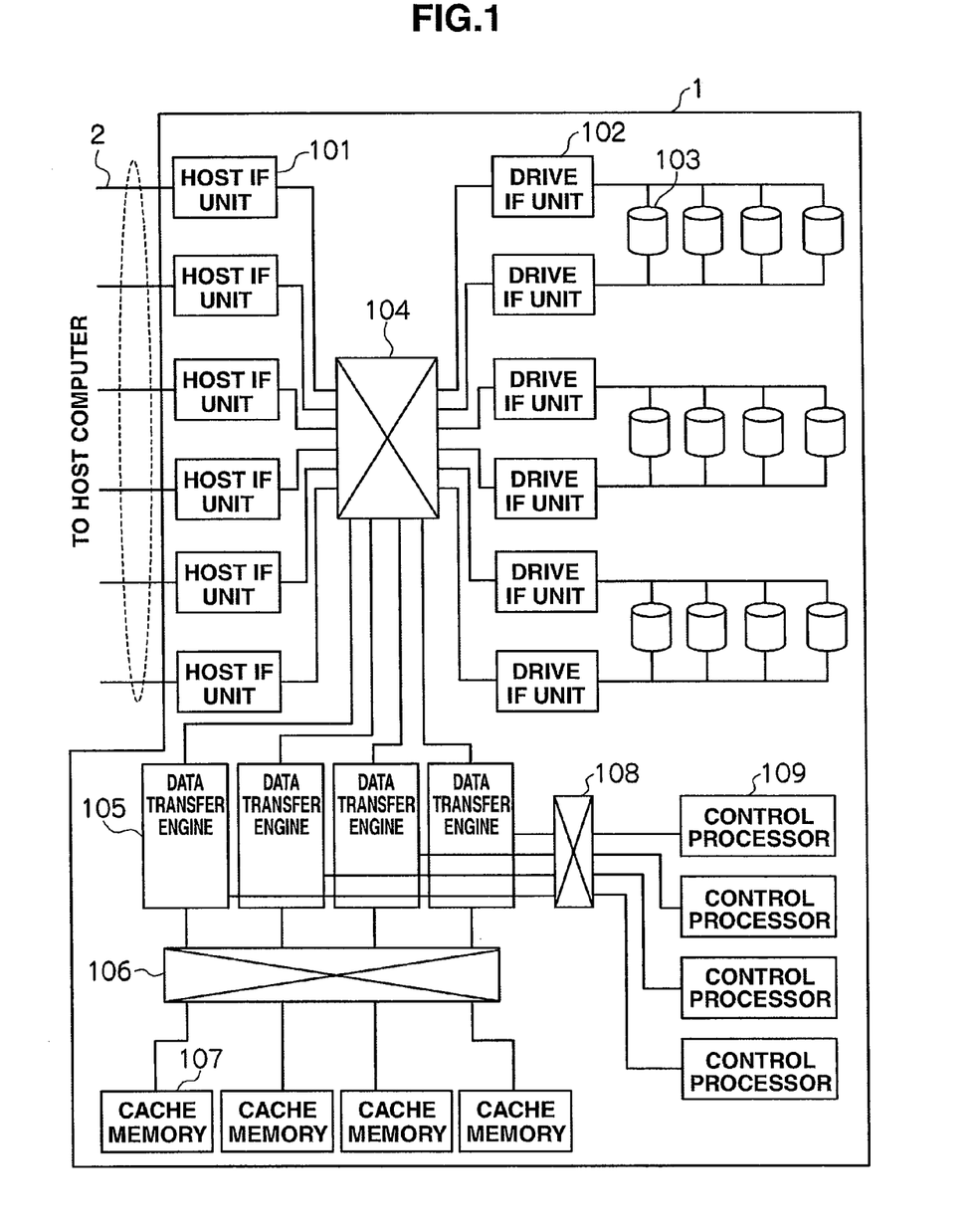
FIG. 1 is a block diagram showing an embodiment of a storage system in the invention.

Embodiments of the invention will be described below with reference to the drawings. FIG. 1 is a block diagram showing a storage system 1 in an embodiment of the invention.

Referring to FIG. 1, the storage system 1 includes host IF (Interface) units 101, drive IF units 102, disk drives 103, a transfer switch 104, data transfer engines 105, a cache switch 106, cache memories 107, a control signal switch 108, and control processor units 109. Each host IF unit 101 is connected, via a communication network 2, to a host computer, which is not shown in FIG. 1.

Each host IF unit 101 functions as an interface for exchanging data with the host computer via the communication network 2, and is connected, via the transfer switch 104, to the drive IF units 102 and the data transfer engines 105. Each drive IF unit 102 is connected to disk drives 103 as storage units including storage devices.

The transfer switch 104 is configured to switch data transfer between the host IF units 101 and the data transfer engines 105 and between the drive IF units 102 and the data transfer engines 105.

Each data transfer engine 105 is connected to the cache memories 107 via the cache switch 106, and to the control processors 109 via the control signal switch 108. The data transfer engine 105 is configured to transfer data between the cache memories 107 and the host IF units 101 via the cache switch 106, and between the cache memories 107 and the drive IF units 102 via the transfer switch 104 or the cache switch 106.

Figure 2:
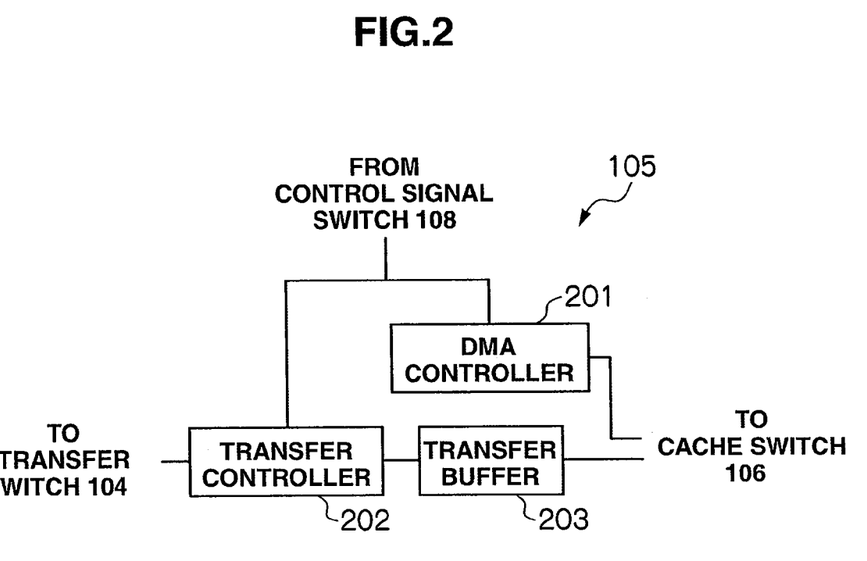
FIG. 2 is a block diagram showing a data transfer engine.

More specifically, as shown in FIG. 2, each data transfer engine 105 includes a DMA (Direct Memory Access) controller 201 for controlling, via the cache switch 106, data read/write from/to the cache memories 107, a transfer controller 202 for controlling data transfer to the transfer switch 104, and a transfer buffer 203 for temporarily storing data exchanged with the transfer controller 202 when transferring the data to the cache memories 107 via the cache switch 106.

The cache switch 106 functions as a switch for shifting routes connecting the data transfer engines 105 and the cache memories 107. Each cache memory 107 functions as a memory device for temporarily storing data read/written from/to the disk drives 103. The control signal switch 108 is configured to switch control signals communicated between the data transfer engines 105 and the control processors 109.

Figure 3:
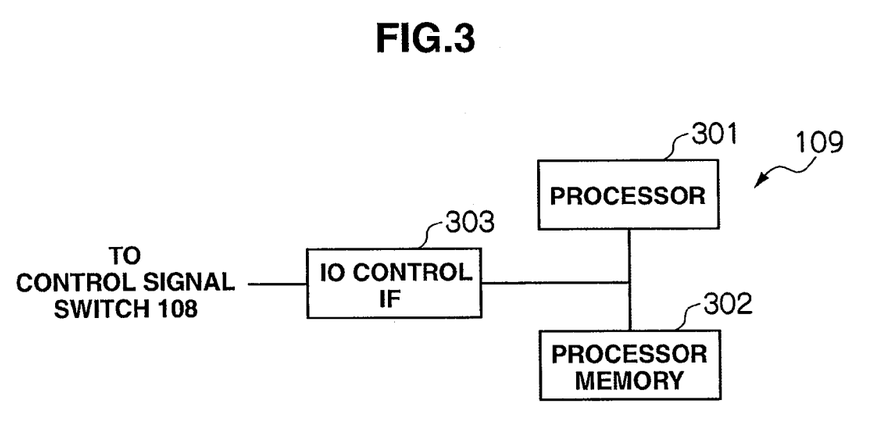
FIG. 3 is a block diagram showing a control processor.

As shown in FIG. 3, each control processor 109 includes a processor (control processor) 301 for executing various kinds of arithmetic processing according to a program and various types of control, a processor memory 302 for storing various processing programs and various kinds of data, and an IO control IF 303 for controlling exchange of control signals via the control signal switch 108.

Each control processor 109 is configured to control the data transfer engines 105; control data transfer between the host IF units 101 and the cache memories 107, and between the drive IF units 102 and the cache memories 107; logically partition resources in the storage system 1 that are targets of access from the host computer into logical partitions; and make each logical partition work as a virtual storage system.

The processor 301 creates logical partitions by logically partitioning resources including the host IF units 101, drive IF units 102, disk drives 103, data transfer engines 105, cache memories 107, and processor 301, and changes the proportion of resources allocated to each logical partition according to the amount of access from the host computer. For example, the processor 301 changes the proportion of resources allocated to a logical partition according to the proportion of the resources being used by the logical partition. When doing so, the processor 301 observes the proportion of the resources being used by each logical partition, and increases, by a predetermined fixed percentage, the proportion of resources allocated to a logical partition if, according to the observed proportion, the proportion of the resources being used by the logical partition exceeds a preset range. Meanwhile, if, according to the observed proportion, the proportion of resources being used by a logical partition is below the preset range, the processor reduces, by a predetermined fixed percentage, the proportion of resources allocated to the logical partition.

A program for controlling the resource allocation in order to logically divide the resources in the storage system 1 into logical partitions is referred to as a "hypervisor," and one such program is executed on each processor 301.

Figure 4A:
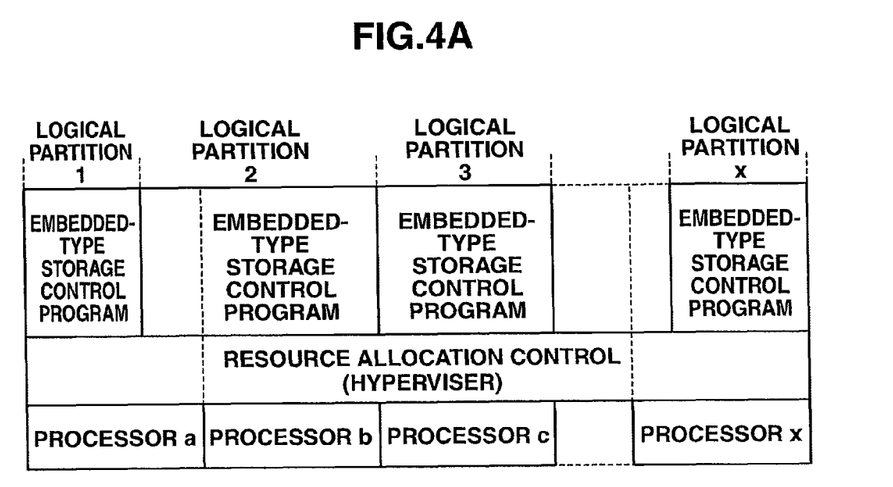
FIG. 4(a) is a diagram showing the logical concept applied when a storage control program is of an embedded system not including an OS, and FIG. (4) is a diagram showing the logical concept applied when a storage control program is of an embedded system including an OS.

For example, as shown in FIG. 4(a), the processor 301 consists of processors a to x. If a storage control program that operates in each logical partition is an embedded system not including an OS (Operating System), the hypervisor for controlling the resource allocation calls a driver program for directly controlling hardware to manage the resource hardware. In other words, when a hypervisor logically partitions the resources, the hypervisor manages, for the storage control program for each logical partition, the hardware allocated to the logical partition, and controls the relevant section in the allocated hardware in response to a request from the storage control program.

Figure 4B:
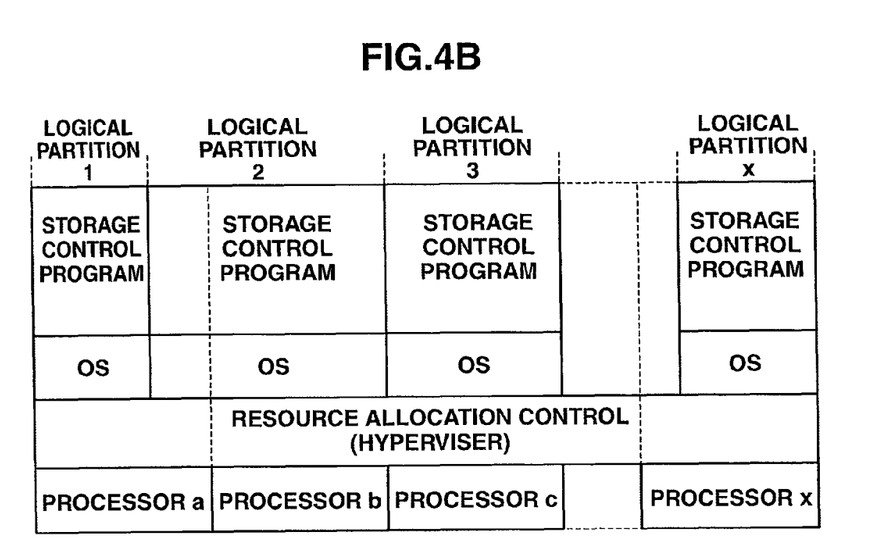

If, as shown in FIG. 4(b), the storage control program that operates in each logical partition includes an OS, the OS works between the storage control program and the hypervisor in the logical partition. The storage control program calls the OS for controlling storage hardware. The OS processes requests from the storage control program and calls the hypervisor instead of a driver program that directly controls the hardware. In that case, the hypervisor functions as the driver program. In other words, the hypervisor functions as the driver program for the OS and controls the allocation of resources to each logical partition, and also calls its own driver program to control the hardware.

Figure 5:
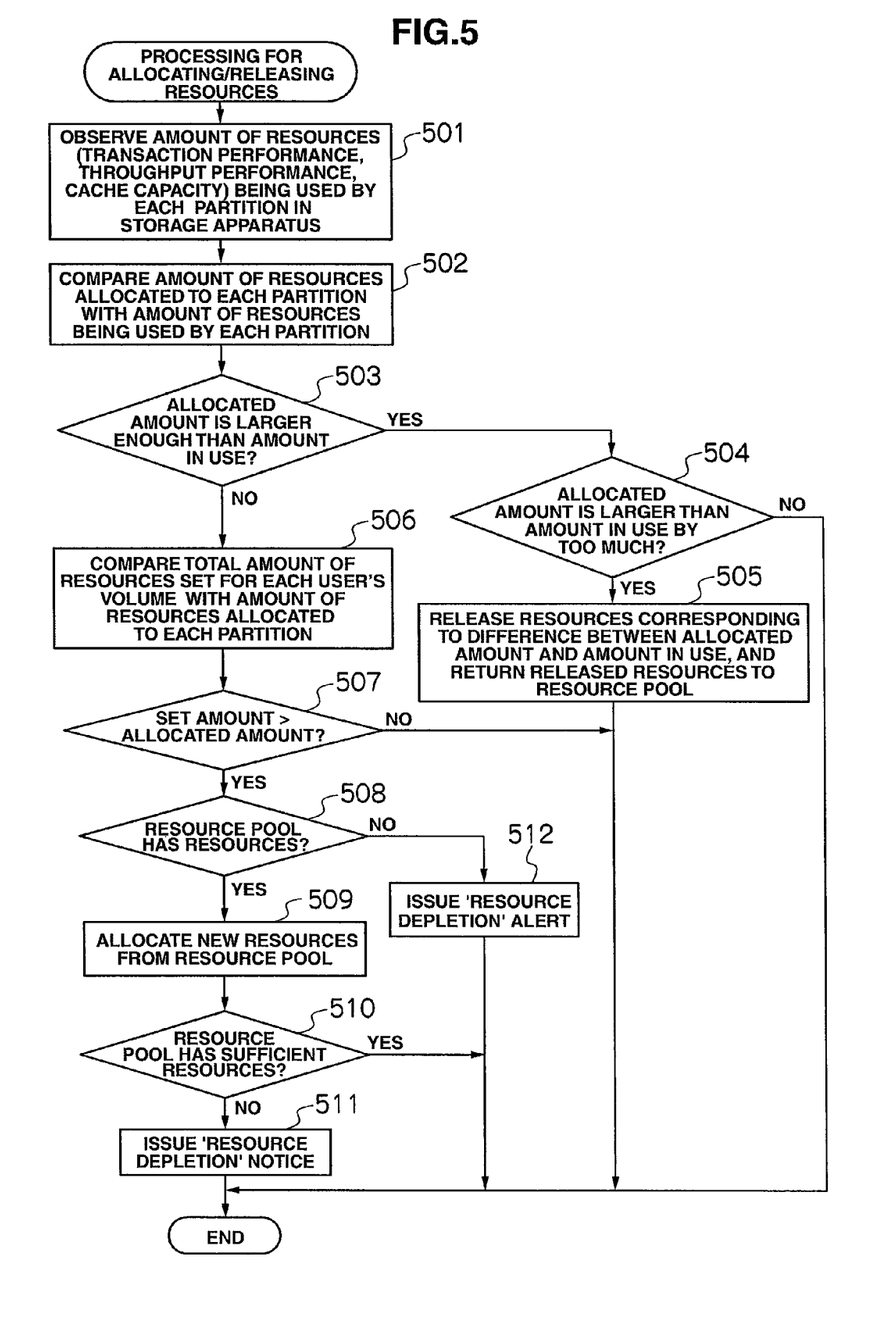
FIG. 5 is a flowchart illustrating a method for allocating/releasing resources according to an embodiment of the invention.

Next, a method for allocating/releasing resources according to an embodiment of the invention will be described with reference to the flowchart in FIG. 5. This processing is executed for the allocation (amount of allocation) of resources to each logical partition. Examples of the amount of allocation include the capacity of the cache memories 107 allocated to each logical partition; the data transfer engines 105 amount allocated to each logical partition, e.g., the number of data transfer engines 105 to be used and the proportion of time for using the data transfer engines 105 allocated to each logical partition; and the control processors 109 amount allocated to each logical partition, e.g., the number of processors 109 to be used and a proportion of time for using the control processors 109 allocated to each logical partition. The sequence of partitioning the resources into each logical partition is realized by processing executed by the hypervisor.

First, the hypervisor observes, as the amount of resources being used by each partition in the storage system, the transaction performance and throughput performance of IO control resources and the cache capacity (S501), compares the amount of resources allocated to each logical partition with the amount of resources being used by each logical partition (S502), and checks whether or not the allocated amount is larger enough than the amount in use, e.g., larger by 10% (S503).

If the allocated amount is larger enough than the amount in use in step S503, the hypervisor checks whether or not the allocated amount is larger than the amount in use by too much, e.g., larger by 50% (S504). If the allocated amount is not larger by too much, the processing in this routine is terminated. If the allocated amount is larger by too much, the resources corresponding to the difference between those amounts are released and returned to a resource pool (S505), and then the processing in this routine is terminated. In other words, if in steps S504 and S505 a difference exists between the allocated amount and the amount to be released, the resources that have been already allocated are not immediately released because of a small change in the amount of resources in use, but the overhead generated due to allocation/release control is reduced.

Meanwhile, if the allocated amount is not larger enough than the amount in use in step S503, the hypervisor compares the total amount of resources set to each user's volume with the amount of resources allocated to each partition (S506), and checks whether or not the amount of the set resources is larger than the allocated amount (S507). If the amount of the set resources is larger than the allocated amount, the hypervisor checks whether or not the resource pool has any resources (S508). If the resource pool has resources, new resources are allocated from the resource pool (S509), and the hypervisor then checks whether or not sufficient resources remain in the resource pool (S510). If sufficient resources remain in the resource pool, the processing in this routine is terminated. If the remaining resources are not sufficient, the hypervisor issues a 'resource depletion' notice (S511), and then the processing in this routine is terminated. If no resources remain in the resource pool in step S508, the hypervisor issues a 'resource depletion' alert (S512), and then the processing in this routine is terminated.

Figure 6:
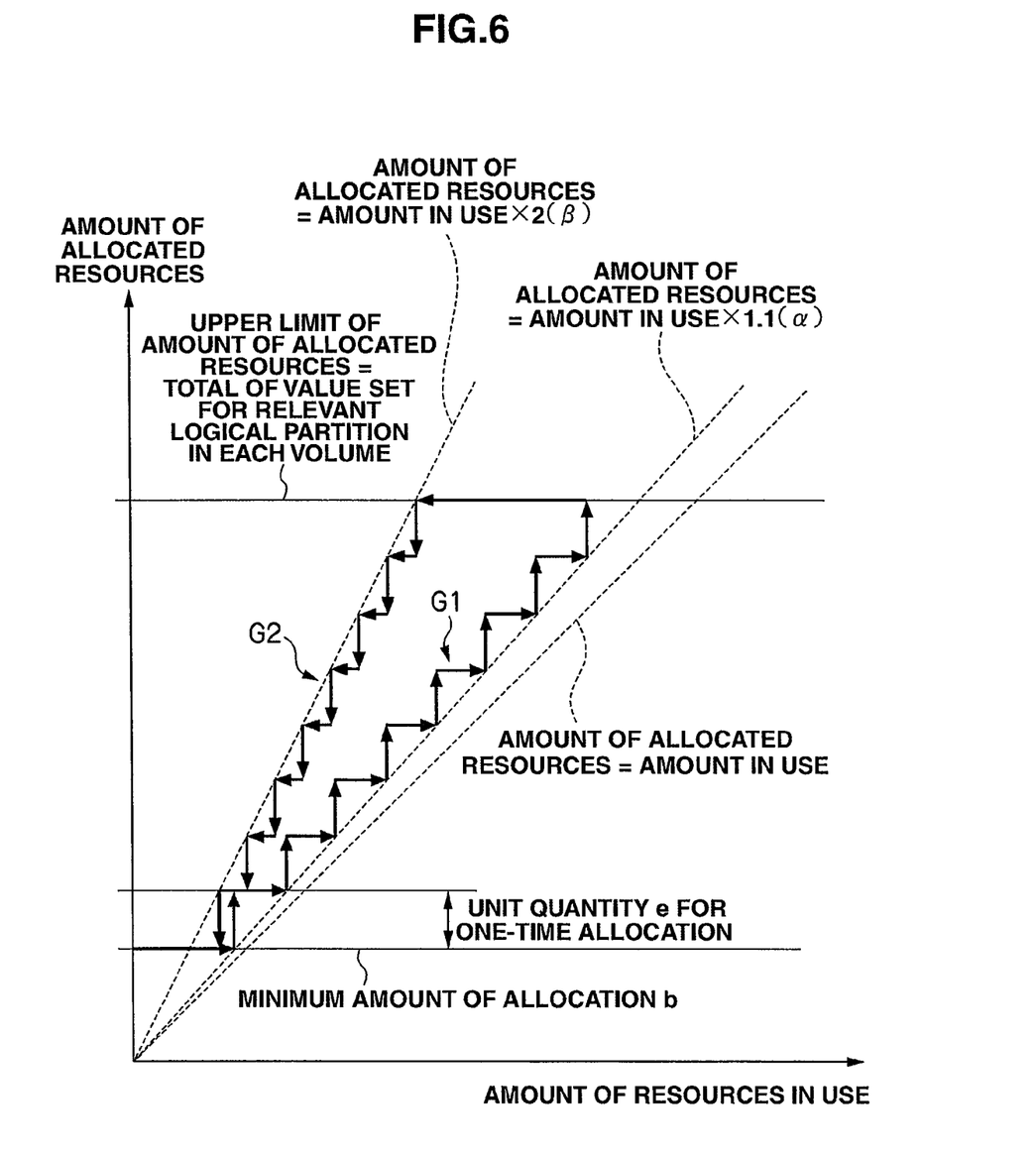
FIG. 6 is a characteristic diagram illustrating the relationship between the amount of allocated resources and the amount of resources in use.

When resources are allocated/released, as shown in the example in FIG. 6, if the minimum amount of allocation is b, the unit quantity of one-time allocation/release is e, the difference between the allocated amount and the amount in use triggering new resource allocation is +10% (1.1 times) the current amount in use, and the difference triggering resource release is double the current amount in use, the characteristics of increasing of the amount of allocation by a predetermined percentage when the amount in use exceeds a set range are represented by graph G1. The characteristics of reducing of the amount of allocation by a predetermined percentage when the proportion of resources in use is below the set range, e.g., when the current amount of resources in use is below a half the amount of currently allocated resources, are represented by graph G2.

When resources are stably allocated/released, if the minimum amount of allocation is b, the unit quantity of one-time resource allocation/release is e, the difference triggering new resource allocation is $\alpha$ times the current amount in use, and the large difference triggering resource release is $\beta$ times the current amount in use, the formulas $(b+e)<(b/\alpha)\beta$, $\therefore (\beta/\alpha)>(1+e/b)$ are formed.

In other words, when new allocation/release is required, if the unit quantity of allocation is n, allocation is required if the amount of resources in use exceeds $(b+ne)/\alpha$, and release is required if the amount of resources in use is below $(b+ne)/\beta$. For stable allocation/release, it is necessary for resources to not be released immediately after the allocation is executed, and also for resources to not be allocated immediately after the release is executed. Accordingly, $(b+ne)/\alpha > (b+ne+e)/\beta$ or $(b+ne)/\beta < (b+ne-e)/\alpha$, $\therefore \beta/\alpha > (b+ne+e)/(b+ne)$ $(n=0, 1, 2, \ldots)$ or $\beta/\alpha > (b+ne)/(b+ne-e)$ $(n=1, 2, 3, \ldots)$.

In those formulas, if n is a value with which the right-hand side becomes infinity, the both formulas become $\beta/\alpha > 1 + (e+b)$.

Also, in the formulas, the unit quantity e of one-time resource allocation/release is a fixed value determined for each resource.

In this embodiment, the amount of resources being used by each partition is compared with the amount of resources allocated to the partition to allocate/release the resources. By doing so, the amount of allocation indicating the proportion of allocation resources in the storage system 1 can be dynamically changed.

Figure 7:
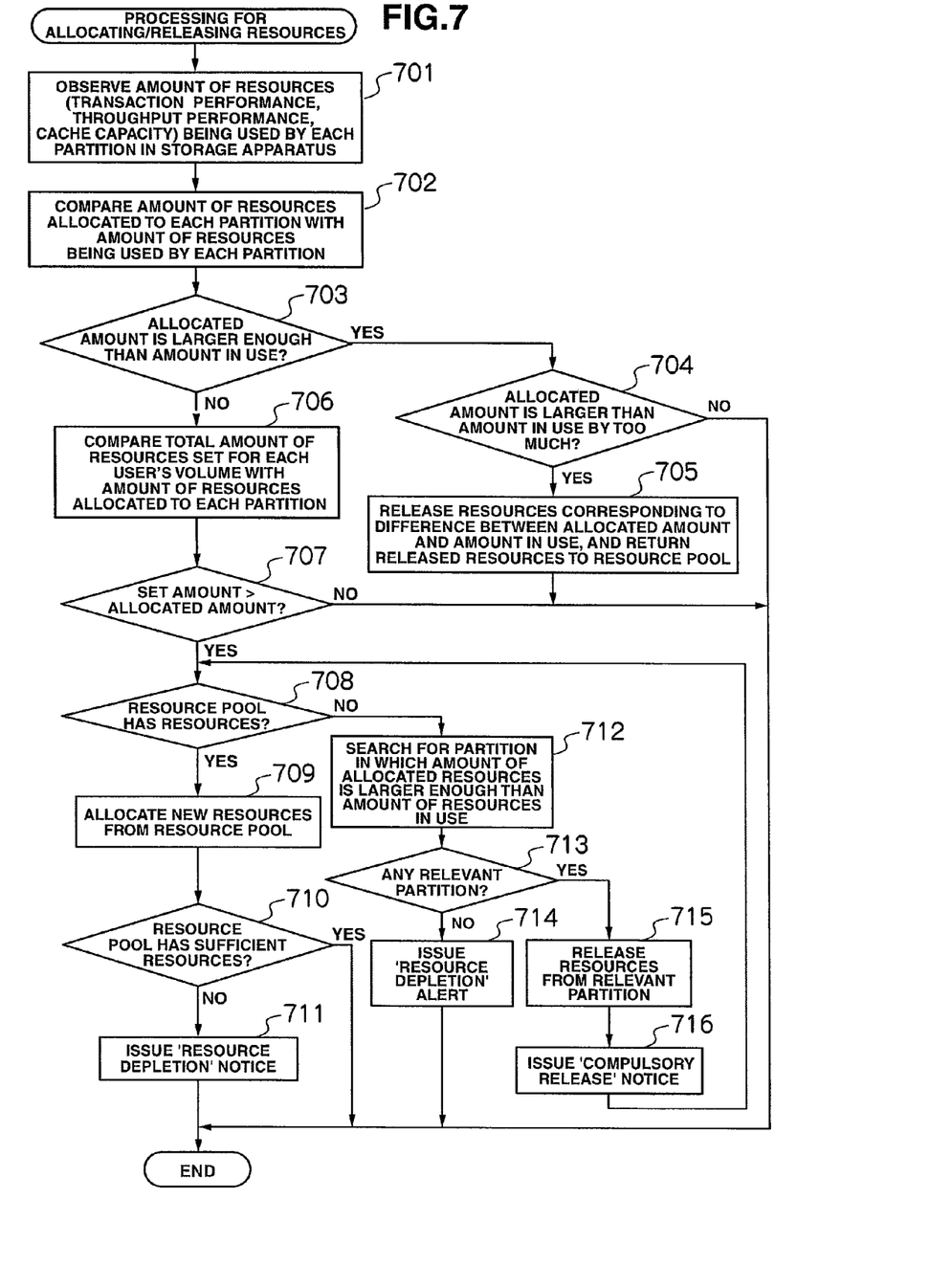
FIG. 7 is a flowchart illustrating a method for allocating/releasing a resource according to another embodiment of the invention.

Next, another method for allocating/releasing resources will be described with reference to the flowchart in FIG. 7. This processing is also executed by the hypervisor. Since the processing in steps S701-711 is the same as that in steps S501-511, only the processing in step S712 and the following steps will be described below.

If the resource pool has no resources in step S708, the hypervisor searches for a partition in which the amount of resources allocated is larger enough than the amount of resources in use (S712), checks whether or not any such partition (e.g., a partition in which the amount of resources allocated is 1.5 times the amount of resources in use) exists (S713). If no such partition exists, a 'resource depletion' alert is issued (S714) and the processing in this routine is terminated. If one does exist, resources in the relevant partition are released (S715), and a 'compulsory release' notice is issued (S716). Then the processing returns to step S708, and steps S708-S716 are repeated.

In this embodiment, the amount of resources being used by each partition is compared with the amount of resources allocated to the partition to allocate/release the resources, so the amount of allocation indicating the proportion of resources in the storage system 1 can be dynamically changed. If the resource pool has no resources, a partition in which the allocated amount is larger enough than the amount of resources in use is searched for: if any such partition exists, resources are released from that partition and the released resources are allocated as new resources to another partition. In this way, resources can be effectively used.

Figure 8:
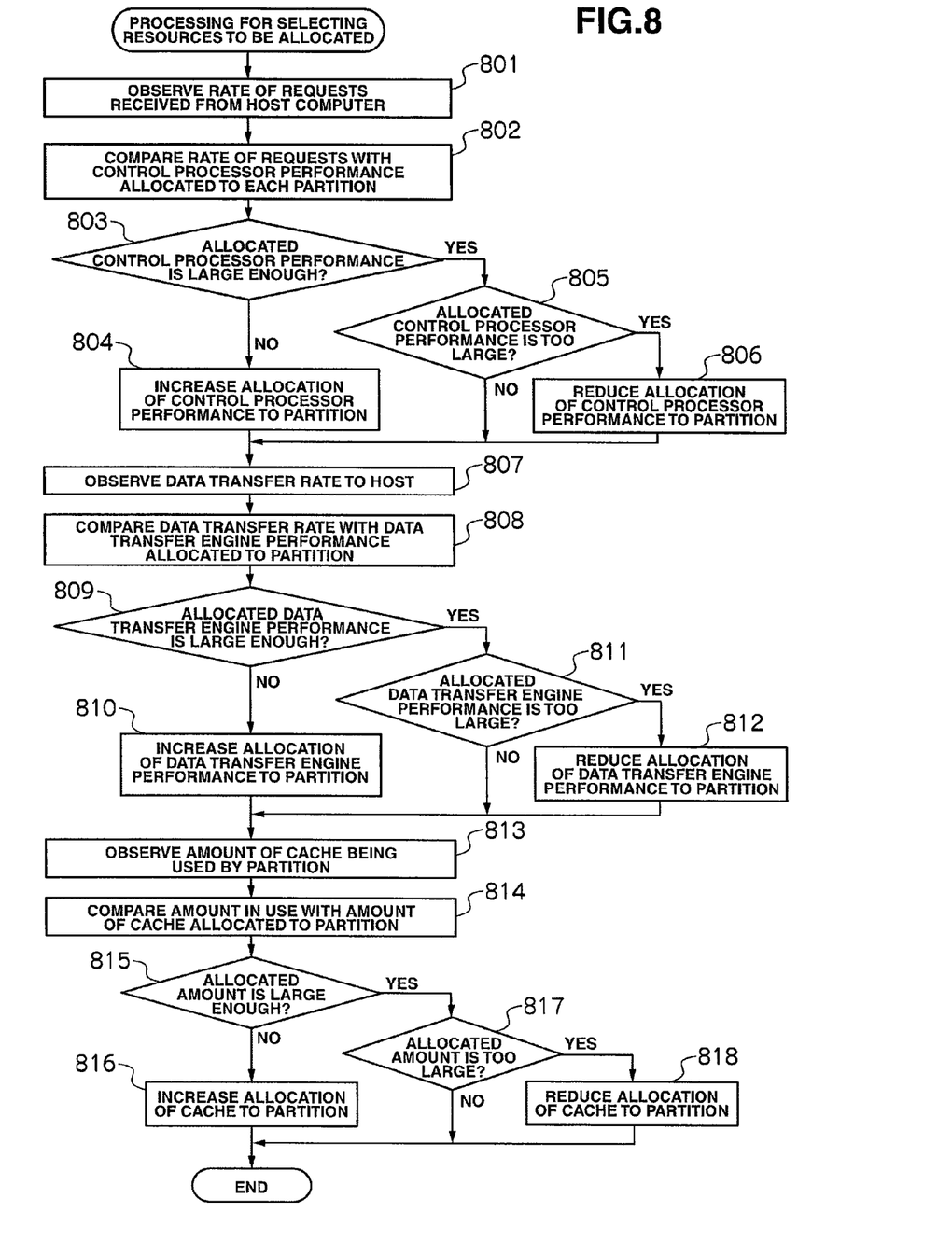
FIG. 8 is a flowchart showing processing for allocating plural kinds of resources.

Next, processing for dynamically allocating plural kinds of resources will be described below with reference to the flowchart in FIG. 8. This processing is realized by the hypervisor. The hypervisor first observes the rate of requests from the host computer received by each partition (S801), compares the observed rate with the allocated control processor throughput to the partition (S802), and checks whether or not the allocated control processor throughput is large enough with respect to the observed rate (S803). If not large enough, the hypervisor increases the allocation of the control processor throughput to the partition (S804), and the processing proceeds to the next step. If large enough, the hypervisor checks whether or not the allocated control processing throughput is too large with respect to the observation rate (S805). If too large, the hypervisor reduces the allocation of the control processor throughput to the partition (S806), and the processing proceeds to S807.

After that, the hypervisor observes data transfer rate to the host computer (S807), compares the data transfer rate from the host computer with the allocation of the data transfer engine throughput to each partition (S808), and checks whether or not the allocation of the data transfer engine throughput is larger enough than the observed data transfer rate (S809). If not larger enough, the hypervisor increases the allocation of the data transfer engine throughput to the partition, and the processing proceeds to the next step. If larger enough, the hypervisor checks whether or not the allocation of the data transfer engine throughput is larger than the observed data transfer rate by too much (S811). If larger by too much, the hypervisor reduces the allocation of the data transfer engine throughput to the partition (S812), and the processing proceeds to S813.

Next, the hypervisor observes the amount of cache being used by each partition (S813), compares the amount of cache being used by each partition with the amount of the cache allocated to the partition (S814), and checks whether or not the amount of the allocated cache is large enough with respect to the amount of cache being used (S815). If not large enough, the hypervisor increases the allocation of the cache to the partition, and the processing in this routine is terminated. If large enough, the hypervisor checks whether or not the allocation of the cache is too large with respect to the amount of cache in use (S817). If too large, the hypervisor reduces the amount of the cache allocated to the partition (S818), and the processing in this routine is terminated.

In the above described embodiment, the amount of each kind of resource in use is compared with the allocation of throughput of each kind of resources based on the rate of requests from the host computer received by each partition, and the allocation of throughput of the resources is increased or reduced based on the result of comparison. In this way, the allocation of throughput of each kind of resource can be dynamically changed based on the rate of requests from the host computer received by each partition.

In the above described embodiments, the hypervisor is, in practice, software at a level closest to hardware in each control processor. If an operating system is included in the partition, the operating system operates at a level higher than the hypervisor. In that case, the interface between the hypervisor and hardware can be seen, from the operating system, as being virtualized. Accordingly, when an operating system is operating in the partition, the operating system is not aware of the existence of the hypervisor or logical partitions.

In order to have a hypervisor operate in each control processor, a method of generating an interruption to each control processor at repeated predetermined points in time so that the hypervisor operates for the control processor only a fixed percentage of time determined by the system can be used. Alternatively, a method of observing the rate of requests from the host computer received by each partition, the amount of data transfer to the host computer per unit of time, or the amount of cache in use, comparing the observations for each kind of resource with each of the currently available resources, and separately requesting starting of each hypervisor when the available resources are not larger enough/larger by too much than the observations to allocate/release the resources may also be used.

The difference between the allocated amount and the amount in use triggering resource allocation/release is defined as follows. For example, in one-time allocation/release, the difference triggering resource allocation, as a predetermined fixed amount of resources are allocated/released, is set to a small value so that the amount of resources allocated does not become larger by too much than the amount of resources in use immediately after a predetermined amount of resources is allocated. Meanwhile, if the value is set too small, resource allocation frequently becomes necessary in response to changes in the amount of resources in use, so the time taken for hypervisor processing increases, and consequently system efficiency deteriorates.

The difference between the amount of resources allocated and the amount of resources in use triggering resource release is set to be a large value so that resources do not run short and allocation does not become necessary immediately after resources are released. If the difference triggering resource release is set too large, resources are not released and the total resource usage rate decreases, and consequently system efficiency deteriorates. Preferably, the difference triggering resources allocation is set as large as possible, but within a range where release of resources does not become necessary immediately after resources are allocated. Also, the difference triggering resource release is set as small as possible, but within a range where allocation of resources does not become necessary immediately after resources are released.

If the difference triggering resource allocation is 1.1 times the amount of resources in use and the difference triggering resource release is 2 times the amount of resources in use, $2/1.1=1.8181\ldots$. Accordingly, the unit quantity of one-time resource allocation can be set up to about 80% of the minimum allocation to each logical partition.

When the allocation of resources is dynamically increased/decreased, the observed amount of resources in use is always compared with the amount of currently allocated resources. Therefore, if the amount of resources in use nearly exceeds, based on the comparison result, the amount of currently allocated resources, i.e., the current amount of resources in use is not larger enough than the amount of currently allocated resources, new resources have to allocated if allocatable resources remain. However, it is also necessary to release resources if the amount of resources in use is smaller enough than the amount of currently allocated resources.

More specifically, the control processor always observes the rate of requests from the host computer received by each partition, and compares the rate with the amount of processors currently allocated to the logical partition. The allocation of the processors to the logical partition is defined by the throughput of processing the requests from the host computer per unit of time. In other words, the current allocation of time to the logical partition to use the processor is increased/reduced according to the throughput of the processor's processing the requests from the host computer per unit of time.

Regarding the data transfer engines, the control processor observes, for each logical partition, the current amount of data transfer to the host computer per unit of time and the current amount of data transfer to each logical partition per data transfer engine, and compares the observations with the data transfer engine amount currently allocated to each logical partition. In this situation, the data transfer engine allocation amount is defined by the data transfer performance per unit of time. In other words, the current allocation of time for using the data transfer engines to each logical partition is increased/reduced according to the data transfer performance of the data transfer engines per unit of time.

The control processor observes the amount of cache actually being used by each logical partition, and increases/reduces the cache memory allocation amount by comparing the observed amount with the current amount of allocation of the cache memory.

If no allocatable resources remain when the control processor is about to allocate new resources, the priority may be set among logical partitions so that resources that have been allocated to a low-priority logical partition can be forcefully released and allocated to another logical partition.

What is claimed is:

1. A storage system comprising:
    a storage unit including plural storage devices;
    plural processors for controlling data Input/Output (I/O) to/from the storage unit in response to a data I/O request from a host computer; and
    a data transfer unit for connecting each processor to the storage unit and inputting/outputting data,
    wherein each processor creates plural logical partitions by logically partitioning the storage unit, the data transfer unit, and the processors, controls the logical partitions so that each logical partition separately operates as an independent storage system, and changes a proportion allocated to each logical partition according to an amount of access from the host computer, and
    wherein each processor changes a proportion of the storage unit, the data transfer unit, and the processors allocated to each logical partition according to the proportion of the storage unit, the data transfer unit, and the processors being used by each logical partition.

2. The storage system according to claim 1, wherein each processor observes the proportion of the storage unit, the data transfer unit, and the processors being used by each logical partition, and increases, by a predetermined percentage, the proportion of the storage unit, the data transfer unit, and the processors allocated to a logical partition if, according to the observation, the proportion being used by the logical partition exceeds a preset range.

3. The storage system according to claim 1, wherein each processor observes the proportion of the storage unit, the data transfer unit, and the processors being used by each logical partition, and reduces, by a predetermined percentage, the proportion of the storage unit, the data transfer unit, and the processors allocated to a logical partition if, according to the observation, the proportion being used by the logical partition is below a preset range.

4. A storage system comprising:
    two or more host IF units connected to a host computer;
    two or more disk drives;
    two or more drive IF units connected to the disk drives for controlling the disk drives;
    cache memory for temporarily storing data read/written from/to the disk drives;
    two or more data transfer engines for transferring data between the host IF units and the cache memory or between the drive IF units and the cache memory;
    a transfer switch for connecting the host IF units, the disk IF units, and the data transfer engines;
    a cache switch for connecting the data transfer engines and the cache memory;
    two or more control processors; and
    a control signal switch for switching control signal lines between the data transfer engines and the control processors,
    wherein each control processor creates plural logical partitions by logically partitioning the host IF units, the disk drives, the cache memory, the data transfer engines, and the processors, controls the logical partitions so that each logical partition separately operates as an independent storage system, and changes a proportion of the host IF units, the disk drives, the cache memory, the data transfer engines, and the processors allocated to each logical partition according to an amount of access from the host computer.

5. The storage system according to claim 4, wherein each processor changes, according to the proportion of the host IF units, the disk drives, the cache memory, the data transfer engines, and the processors being used by each logical partition, the proportion of the host IF units, the disk drives, the cache memory, the data transfer engines, and the processors allocated to each logical partition.

6. The storage system according to claim 5, wherein each processor observes the proportion of the host IF units, the disk drives, the cache memory, the data transfer engines, and the processors being used by each logical partition, and increases, by a predetermined percentage, the proportion of the host IF units, the disk drives, the cache memory, the data transfer engines, and the processors allocated to a logical partition if, according to the observation, the proportion of the host IF units, the disk drives, the cache memory, the data transfer engines, and the processors being used by the logical partition exceeds a preset range.

7. The storage system according to claim 5, wherein each processor observes the proportion of the host IF units, the disk drives, the cache memory, the data transfer engines, and the processors being used by each logical partition, and reduces, by a predetermined percentage, the proportion of the host IF units, the disk drives, the cache memory, the data transfer engines, and the processors allocated to a logical partition if, according to the observation, the proportion of the host IF units, the disk drives, the cache memory, the data transfer engines, and the processors used by the logical partition is below a preset range.

* * * * *